ing Kyung S. Shim,
United States Patent [19]

Walsh et al.

[11] 4,012,463

[45] Mar. 15, 1977

[54] METHOD OF PREPARING STABLE CONDENSATION PRODUCTS USING A LEWIS ACID CATALYST AND PRODUCTS THEREOF

[75] Inventors: Edward N. Walsh, New City; Fred Jaffe, Ossining; Milton L. Honig, New York; Kyung S. Shim, Irvington, all of N.Y.; Mervin E. Brokke, Stamford, Conn.

[73] Assignee: Stauffer Chemical Company, Westport, Conn.

[22] Filed: Mar. 11, 1976

[21] Appl. No.: 665,840

Related U.S. Application Data

[63] Continuation-in-part of Ser. No. 473,471, May 18, 1974, abandoned.

[52] U.S. Cl. .......................... 260/928; 260/2.5 AJ; 260/2.5 AR; 260/978; 260/983
[51] Int. Cl.² .................................... C07F 9/08
[58] Field of Search .................... 260/928, 978, 983

[56] References Cited

UNITED STATES PATENTS 3,641,202  2/1972  Biranowski et al. ........... 260/928 X
3,822,327  7/1974  Weil .................................. 260/928

*Primary Examiner*—Richard L. Raymond
*Attorney, Agent, or Firm*—Richard P. Fennelly

[57] ABSTRACT

The neutralization of products which are phosphorus containing oligomers having

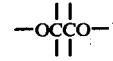

linkages between phosphorus atoms and which are obtained by the self-condensation of β-halo-alkyl esters of pentavalent phosphorus acids or by the condensation of these esters with an alkyl ester of a pentavalent phosphorus acid is accomplished by reaction with an alkylene oxide, either alone or in combination with water or an alcohol having the formula ROH where R is a $C_1$–$C_{20}$ alkyl group, and is enhanced by heating the products with a Lewis acid to promote alcoholysis reactions between labile groups contained therein and structures formed by alkylene oxide neutralization of free acid groups. The stabilized product formed by this process gives a better cure when incorporated in a polyurethane foam.

14 Claims, No Drawings

METHOD OF PREPARING STABLE CONDENSATION PRODUCTS USING A LEWIS ACID CATALYST AND PRODUCTS THEREOF

CROSS-REFERENCE TO A RELATED APPLICATION

This is a continuation-in-part of U.S. application Ser. No. 473,471, filed May 18, 1974, now abandoned.

TECHNICAL DESCRIPTION OF THE INVENTION

The present invention is a process for forming an improved condensation product of $\beta$-haloalkyl esters of pentavalent phosphorus acids which have flame retardant properties. A number of processes for formation of the class of compounds of interest herein are described in the patent literature and in copending applications including the following:

1. U.S. Pat. No. 3,513,644 to Edward D. Weil which describes the preparation of polycondensed oligomeric phosphates by heating of tris (2-haloalkyl) phosphates.
2. U.S. Pat. Nos. 3,641,202 and 3,695,925 to Edward D. Weil which describe the preparation of oligomeric poly-condensed phosphonates from bis(haloalkyl) vinyl phosphonates.
3. U.S. Pat. No. 3,896,187 of Edward D. Weil which describes liquid poly(haloethyl-ethyleneoxy) phosphoric acid esters prepared by condensing tris(2-haloethyl) phosphate.
4. U.S. Ser. No. 558,862, filed Mar. 17, 1975 and U.S. Pat. No. 3,855,359 of Edward D. Weil which describe the copolycondensation of certain phosphates and phosphonates having a 2-haloalkyl group on at least one of these reactants.
5. U.S. Pat. No. 3,822,327 of Edward D. Weil which described homo- and co-polycondensates of bis(2-haloethyl) vinyl-phosphonates.
6. U.S. Pat. No. 3,891,727 of Edward D. Weil which relates generally to condensation products of haloalkyl esters of pentavalent phosphorus acids.

These patents and disclosures insofar as they relate to the condensation products usable in the practice of the instant invention are incorporated herein by reference.

The process of this invention is particularly applicable to the homopolycondensation product of tris(2-chloroethyl) phosphate, to the copolycondensation product of bis(2-chloroethyl) vinylphosphonate and dimethyl methylphosphonate, to the copolycondensation product of bis(2-chloroethyl) vinylphosphonate and trimethyl phosphate, to the homopolycondensation product of bis (2-chloroethyl) vinylphosphonate, and to the copolycondensation product of tris-(2-chloroethyl) phosphate and dimethyl methylphosphonate.

Briefly, the polycondensation products are produced by reacting the monomers (both of which, as has already been noted, may be the same) to give off a volatile alkyl halide or alkylene dihalide and leave behind a non-volatile oligomeric condensation product.

The polycondensation reaction can be run without a catalysts, but, to permit lower temperatures and/or shorter reaction times, it is preferably conducted in the presence of a nucleophilic catalyst. Suitable quantities of catalyst are from a few parts per million, e.g., 50 p.p.m., up to about 10% by weight, preferably 0.01–5% based on the weight of the reaction mixture.

The reaction mixture, with the proper amount of catalyst, if desired, and in the desired molar ratio of starting materials, is heated to a temperature within the range of from about 110° to about 250° C., preferably 160°–190° C. Further details concerning the condensation reaction may be found in the disclosures previously incorporated herein by reference.

The type of compounds set forth above often contain residual acidity and acid generating groups, such as pyro, or bridged groups, which are labile and which give rise to further acidity when broken. A number of methods for controlling this acidity are possible including the following:

1. The treatment of the compounds with alkylene oxide to remove the residual acidity alone as described in U.S. Pat. No. 3,855,359 to Edward D. Weil.
2. The treatment of the compounds with an alkylene oxide or a compound of the formula ROH where R is a $C_1$–$C_{20}$ unsaturated or saturated alkyl group either concurrently or successively to remove acidity as described in U.S. Pat. No. 3,891,727 to Edward D. Weil.
3. The treatment of the compounds with either an alkylene oxide alone for an extended length of time, e.g., from 3–16 hours; or with an alkylene oxide-water or alcohol-alkylene oxide treatment sequence, e.g., alkylene oxide treatment for about 3–8 hours, 0.3%–10% water or alcohol for about 2–4 hours, and an additional alkylene oxide treatment of 1–10 hours, to remove both residual acidity and cyclic groups which are labile as described in U.S. Ser. Nos. 473,469, 473,468 and 473,470, all filed May 28, 1974 and entitled "METHOD OF PREPARING STABLE CONDENSATION PRODUCTS AND PRODUCTS THEREFROM USING AN ALKYLENE OXIDE TREATMENT", "METHOD OF PREPARING STABLE CONDENSATION PRODUCTS USING A WATER-ALKYLENE OXIDE TREATMENT AND PRODUCTS THEREFROM", and "METHOD OF PREPARING STABLE CONDENSATION PRODUCTS USING AN ALCOHOL-ALKYLENE OXIDE TREATMENT AND PRODUCTS THEREFROM", RESPECTIVELY.

Each of these disclosures is incorporated herein by reference as showing the general type of neutralization processes with which the present invention is useful.

The alkylene oxide which is used in these processes is any compound having an oxirane group $$\left( \text{i.e., } \diagup C \underset{O}{-\!\!\!-\!\!\!-} C \diagdown \right).$$

Illustrative of these compounds are ethylene oxide, propylene oxide, butylene oxide, styrene oxide, epichlorohydrin, epibromohydrin, diglycidyl ether, glycidyl butyl ether, glycidyl alkyl ether, glycidyl ether of phenol, diglycidyl ether of resorcinol, glycidyl ether of cresol and brominated cresol, glycidyl esters of acids such as acetic, acrylic and methacrylic acid, glycidol, diglycidyl ethers of bisphenol A and related epoxy resins made from bisphenol, or tetrahalobisphenols and epichlorohydrin, the dieposide of dicyclopenteneyl ether, the diepoxide of vinyl-cyclohexene, the diepoxide of cyclohexenylmethyl cyclohexene-carboxylate, the diepoxide of bis(cyclohexenylmethyl) adipate, and the like.

The alcohol ROH which is used in the neutralization reactions discussed above contains either an unsubstituted or substituted $C_1$–$C_{12}$ alkyl group. Included within this definition for R are any alkyl or substituted alkyl groups as long as the substitutent or substituents do not adversely affect removal of the acid generating groups, such as by interfering with the ring opening reactions or anhydride alcoholysis, and which do not cause undesirable side reactions, e.g., reactions with portions of the polycondensation product which would result in a loss of or reduction in fire retardant properties. Usable substituents thus include aryloxy, halogen, alkoxy, alkenyl, aryl, acyl, acyloxy, hydroxy, amido, alkylthio, arylthio, carbalkoxy, carboxamido, cyano and nitro. Suitable alcohols are exemplified by methanol, ethanol, n-butyl alcohol, lauryl alcohol, other monohydric alkanols having up to 20 carbon atoms, allyl alcohol, 2,3-dibromopropanol, tribromoneopentyl alcohol, dibromoneopentylene glycol, ethylene glycol, dibromobutenediol, diethylene glycol, methoxyethanol, ethoxyethanol, butoxyethanol, 2-chloroethanol, benzyl alcohol, glycerol, pentaerythritol, dipentaerythritol, trimethylolethane, trimethylolpropane, sorbitol, glucose, sucrose, lactose, methylglucoside and polyoxyalkylates (especially polyoxyethylated or polyoxypropylated) derivatives of any of the aforementioned polyols, acryloxyethanol, carbamyloxyethanol, acetoxyethanol, methacryloxyethanol, N-hydroxymethylacrylamide, vinyl hydroxyethyl ether, methylolamines, methylolureas, hydroxymethylphenols, and alkanolamines, such as ethanolamine.

It has now been unexpectedly found that the above-described neutralization procedures for forming the stabilized condensates mentioned above can be promoted by the use of a catalytic amount of a Lewis acid. The Lewis acid can, if desired, be present in the product during the period in which the product is being treated with an alkylene oxide, or, if the Lewis acid is one which may be neutralized by the alkylene oxide, e.g., phosphoric acid, it can be added to the condensed product above after or during an initial alkylene oxide treatment. The Lewis acid when in the product at the elevated temperatures which are described in greater detail below will promote alcoholysis reactions in the condensed product arising from reaction of structures having the formula $>P(O)OC_2H_4OH$, which are formed by the initial alkylene oxide neutralization of free acid groups, with any labile groups, e.g., cyclic, pyro, and bridged groups, that are contained in said product. This promotion reaction occurs when the condensed product has already been or is at the same time being neutralized by an alkylene oxide treatment.

"Lewis acids" as that term is used herein are those substances which are capable of receiving one or more pairs of electrons to form a coordinate covalent bond, Encycl. of Chem. Tech., Vol. 1, pp. 218–222, 2nd edition. These compounds include not only hydrogen acids but such compounds as stannous octoate, aluminum chloride and the like. Examples of hydrogen acids are alkyl and aryl sulfonic acid ion exchange resins, hydrogen fluoride, sulfuric acid, phosphoric acid, trifluoroacetic acid, trichloroacetic acid, trifluoromethylsulfonic acid, trichloromethylsulfonic acid and hydrochloric acid. The alkyl and aryl sulfonic acid ion exchange resins are preferred. Examples of other Lewis acids are the salts of tin with $C_1$–$C_{12}$ dicarboxylic acids, $C_1$–$C_{12}$ carboxylic acids, e.g., stannous octoate, the aromatic carboxylic acids, e.g., substituted and unsubstituted benzoic and cinnamic acids, compounds having the formula $Sb(OR)_3$ where R is a $C_1$–$C_{12}$ alkyl group, e.g., tri N-butyl antimonite, a phenyl group, a $C_1$–$C_{12}$ haloalkyl group, aluminum chloride, boron trifluoride, ferric chloride, antimony pentachloride, antimony trichloride, zinc chloride, the compounds $Ti(OR)_4$, where R is as defined above, tin tetrachloride, dibutyl tin dichloride, butyl stannous oxide, and $Al(OR)_3$ where R is as defined above.

The amount of Lewis acid which is used either with the condensed product above after an initial alkylene oxide treatment or in combination with the initial or subsequent alkylene oxide treatments should range between about 0.1 and 4% by weight of the material to be treated, preferably 0.2 to 2%. The temperature of treatment should be sufficient to promote neutralization and can range from about 40° C. to about 180° C., preferably from about 60° C. to about 120° C. The use of these catalysts enables one to operate the above-mentioned neutralization reactions at a much lower temperature or for a much shorter time and thereby avoid undesirable side reactions, such as further condensation of the haloalkyl groups.

The present invention is illustrated by the following Examples:

EXAMPLE 1

A condensed tris(2-chloroethyl) phosphate is formed by the heating of tris(2-chloroethyl) phosphate in the presence of 0.2% $Na_2CO_3$ catalyst at 180° C allowing ethylene dichloride to distill off.

A series of the above condensed tris(2-chloroethyl) phosphates were subjected to ethylene oxide neutralization utilizing stannous octoate as a catalyst. The data set forth below show the superior results both with respect to effecting neutralization at a lower temperature and to improved performance on a polyurethane foam that were obtained compared to an ethylene oxide treatment which did not utilize stannous octoate.

| SAMPLE | %Sn (OCT)$_2$ | E.O. REACTION* TEMP (° C) | TIME (HR) | ACID NO.** (HCl) | GREEN STRENGTH*** |
|---|---|---|---|---|---|
| 1 | 1.0 | 60 | 8.5 | 1.22 | Good |
| 2 | 0.5 | 80 | 6 | 0.3 | Good |
| 3 | 0.5 | 80 | 6 | NIL | Good |
| 4 | 0.5 | 80 | 6 | 0.7 | Good |
| 5 | 0.5 | 80 | 6 | | Fair |
| 6 | NONE | 60 | 6 | 21.8 | Too Acidic to Test |

-continued

| SAMPLE | %Sn (OCT)$_2$ | E.O. REACTION* TEMP (°C) | TIME (HR) | ACID NO.** (HCl) | GREEN STRENGTH*** |
|---|---|---|---|---|---|
| 7 | NONE | 100 | 8 | 7.1 | Poor |

*Ethylene oxide rate of addition is 1% by weight per hour based on weight of condensed product.
**This acid number is measured by treating a 10g sample with 10ml. of 0.1N HCl in 20ml. acetone and 10g water and titrating this with 0.1N NaOH after 20 min. stirring at room temperature. The residual or free acidity when the samples were measured was undetectable. The HCl acid number was used to measure the latent acidity which would manifest itself when labile bonds were broken.
***The polyurethane foam formulation comprised 10 parts of the condensed tris(2-chloroethyl) phosphate, 100 parts of polyol, 4 parts of H$_2$O, 0.1 parts of Niax A-1 catalyst, 0.2 parts of N-ethyl morpholine, 1.0 part of L-548 silicone, 0.4 part T-10 stannous octoate and 50.5 parts of toluene diisocyanate (80%-2,4 isomer and 20%-2,6 isomer). It is cured for 10 minutes at 125° C. and examined. Poor green strength is demonstrated by a tacky top surface on the foam and/or a foam structure which tears easily after the initial cure.

EXAMPLE 2

Two additional samples of condensed tris(2-chloroethyl) phosphate were made and were treated to ethylene oxide treatment.

| SAMPLE | % STANNOUS OCTOATE | E.O. TREATMENT TEMP (°C) | TIME (HRS) | ACID NO. (HCl) |
|---|---|---|---|---|
| 1 | NONE | 100 | 9 | 26.7 |
| 2 | 1.0 | 100 | 2 | 5.6 |

These data illustrate the enhanced effectiveness of the ethylene oxide neutralization utilizing stannous octoate as a catalyst.

EXAMPLE 3

A series of condensed tris(2-chloroethyl) phosphates were formed as set forth in Example 1. These samples were then treated with ethylene oxide at 1% per hour until neutral. The neutralized product was then treated with water at elevated temperature and a second ethylene oxide treatment utilizing in most cases a catalyst. The table sets forth the results. The same polyurethane foam formulation mentioned in Example 1 was used:

| SAMPLE | WATER TREATMENT | CATALYST (BY WEIGHT) | E.O. TREATMENT TEMP. (°C) | TIME (HRS) | ACID NO. (HCl) | GREEN STRENGTH |
|---|---|---|---|---|---|---|
| 1 | 0.5%/60 | 1% Ionac* | 100 | 8 | 4.8 | Good |
| 2 | 0.5%/100 | 1% Ionac | 80 | 8 | 1.4 | Good |
| 3 | 0.5%/100 | NONE | 80 | 8 | 4.2 | Fair |
| 4 | 0.5%/100 | NONE | 80 | 8 | 0.72 | Fair |
| 5 | 0.5%/100 | NONE | 60 | 2 | 4.48 | Fair |

*Ionac C-242: a cation exchange resin - a sulfonated polystyrene resin.

EXAMPLE 4

Six hundred grams of unneutralized condensed tris(2-chloroethyl) phosphate was mixed with 3.0g (0.5 wt%) of tri-n-butyl antimonite and was placed in a reaction flask fitted with a magnetic stirrer. The vessel was heated to 80° C. and ethylene oxide was added at 6 g/hr. After about 5 hours of treatment the reactor was cooled to about 50° C. and was stripped at 10mm. Hg for 2 hours. The product (553g) was collected and was incorporated in the foam formulation described in Example 1. The green strength of the foam was good.

EXAMPLE 5

Benzene phosphinic acid (BPA) was reacted in two separate reactors with ethylene oxide and a catalytic amount of stannous octoate in the second reactor (Reactor No. 2 in the Table below) to determine the effect that a Lewis acid has on the reaction of ethylene oxide on the free acid group alone. The reaction was run at 80° C using 71g of BPA. The stripping conditions were 80° C/40mm Hg/20 min. The Table sets forth the data:

TABLE

| | Reactor 1 | Reactor 2 |
|---|---|---|
| Rxn. Time | 40 hours | 30 hours |
| Ethylene Oxide Used | 235g | 200g |
| Final Product | 105.2g | 96.5g |
| Ethylene oxide reacted (moles/moles BPA) | 1.54 | 1.06 |

The data demonstrate that stannous octoate does not apparently catalyze the reaction of this particular phosphorus acid and an alkylene oxide and suggests that the alcoholysis discussed above is the reaction which is catalyzed by the use of the above discussed Lewis acids in the particular types of condensed products of interest herein.

The condensation products which are encompassed herein are those formed by either the self-condensation of a β-haloalkyl ester of a pentavalent phosphorus acid or by condensation of such an ester with other alkyl esters of pentavalent phosphorus acids. In addition to the particular condensation products described above, this definition also includes the type of condensation products described in U.S. Pat. No. 3,764,640 to Klose.

What is claimed is:
1. A process for forming a stabilized condensation product derived from condensing a β-haloalkyl ester of a pentavalent phosphorus acid with itself or with an alkyl ester of a pentavalent phosphorus acid to form a condensation product which comprises heating the condensation product which has been or is being treated with an alkylene oxide to remove acidity and labile groups therefrom with a catalytically effective amount of a Lewis acid at a temperature sufficient to promote neutralization of labile groups in said product.

2. A process as claimed in claim 1 wherein the Lewis acid is a hydrogen acid.

3. A process as claimed in claim 2 wherein the Lewis acid is selected from the group consisting of alkyl and aryl sulfonic acid ion exchange resins, hydrogen fluoride, sulfuric acid, trifluoromethylsulfonic acid, trichloromethylsulfonic acid, and hydrochloric acid.

4. A process as claimed in claim 3 wherein the Lewis acid is selected from the groups consisting of the alkyl and aryl sulfonic acid ion exchange resins.

5. A process as claimed in claim 1 wherein the Lewis acid is selected from the group consisting of the salts of tin with $C_1$–$C_{12}$ dicarboxylic acids, with $C_1$–$C_{12}$ carboxylic acids and with aromatic carboxylic acids, compounds having the formula $Sb(OR)_3$ where R is a $C_1$–$C_{12}$ alkyl group, an aryl group, a $C_1$–$C_{12}$ hydroxyalkyl group and a $C_1$–$C_{12}$ haloalkyl group, aluminum chloride, boron trichloride, ferric chloride, antimony pentachloride, antimony trichloride, zinc chloride, the compounds $Ti(OR)_4$, where R is as defined above, tin tetrachloride, di-butyl tin dichloride, butyl stannous oxide and $Al(OR)_3$, where R is as defined above.

6. A process as claimed in claim 5 wherein the Lewis acid is stannous octoate.

7. A process as claimed in claim 5 wherein the Lewis acid is tri n-butyl antimonite.

8. A process as claimed in claim 1 wherein the Lewis acid is present in an amount of from about 0.1% to about 4% by weight of the condensed ester.

9. A process as claimed in claim 1 wherein the amount ranges from about 0.2 to about 1% by weight.

10. A process as claimed in claim 1 wherein the treatment temperature ranges from about 40° C. to about 180° C.

11. A process as claimed in claim 1 wherein the condensed product is also treated with an alkylene oxide during the period of heating the condensed product and Lewis acid.

12. A product formed by the process of claim 1.

13. A process as claimed in claim 1 wherein the condensation product which is treated is selected from the group consisting of the homocondensation product of tris(2-chloroethyl) phosphate, the copolycondensation product of bis(2-chloroethyl) vinylphosphonate and dimethyl methylphosphonate, the copolycondensation product of bis(2-chloroethyl) vinylphosphonate and trimethyl phosphate, the homocondensation product of bis(2-chloroethyl) vinylphosphonate, and the copolycondensation product of tris(2-chloroethyl) phosphate and dimethyl methylphosphonate.

14. A stabilized product formed by the process of claim 13.

* * * * *